P. Crosby.
Saw-Set.
N° 18,039.   Patented Aug. 25, 1857.
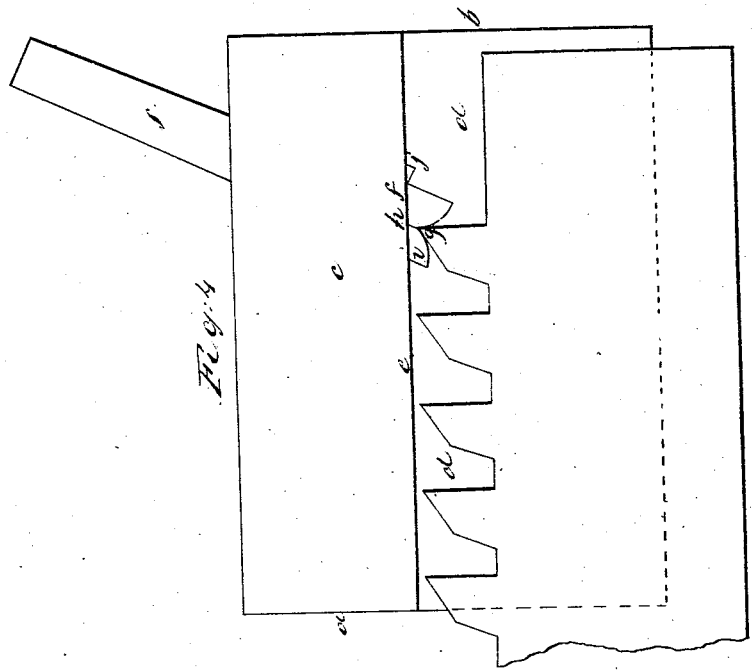
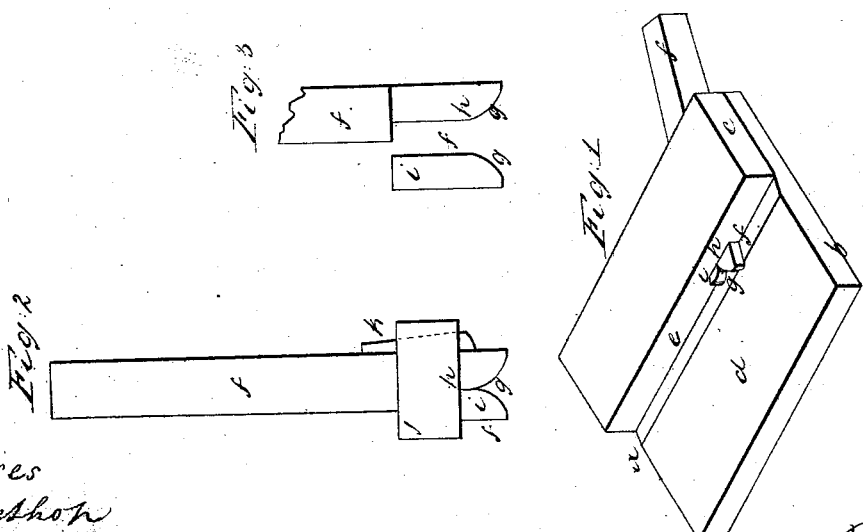
Witnesses
Wm H Bishop
Joel B Wilson
Inventor
Pearson Crosby

UNITED STATES PATENT OFFICE.

PEARSON CROSBY, OF FREDONIA, NEW YORK.

IMPROVED SWAGE FOR SETTING SAW-TEETH.

Specification forming part of Letters Patent No. 18,039, dated August 25, 1857.

*To all whom it may concern:*

Be it known that I, PEARSON CROSBY, of Fredonia, in the State of New York, have invented a new and useful Improvement in the Swage for Setting Saw-Teeth; and I do hereby declare that the following is a full, clear, and exact description thereof, reference being had to the accompanying drawings, making part of this specification, in which—

Figure 1 is a perspective view of the instrument; Fig. 2, a separate view of the swage; Fig. 3, the two parts of the swage separated, and Fig. 4 an elevation of the instrument applied to a saw.

The same letters indicate like parts in all the figures.

The object of my invention is to make an instrument for swaging the cutting-edge of saw-teeth, so as to bring the cutting-edge at right angles with the plane of the plate or the line of cut, to spread the metal laterally, and at the same time condense the metal at and near the cutting-edge and give it the required form and strength.

In the accompanying drawings, $a$ represents a stock to which the swage is fitted and by which it is applied to the teeth of a saw. This stock is made in two parts, $b$ and $c$, properly secured together by screws, the part $b$ being wider than the other part, $c$, to form a rabbet with two faces, $d$ $e$, at right angles, the one $d$ to rest against one face of the saw-plate, and the other, $e$, to guide the position of the instrument by the edge of the saw-teeth. An oblique mortise is made in the two parts, but mainly in the part $c$, to receive the swage $f$ and hold it in the proper position for application to the saw-teeth. The swage $f$ is formed of steel or with the part which acts on the saw-teeth of steel, and the rest of iron. It is made quadrangular with parallel sides, and the part which acts on the saw-teeth cut out, as at $g$, of a V form nearly corresponding with the form of the teeth, as represented at Fig. 4, where it is applied to a saw-tooth. The two faces form an angle a little more obtuse than the saw-tooth, except the part which acts on the cutting-edge of the teeth and for a short distance beyond, and as the object is by a blow to swage the cutting-edge of the saw-tooth, if the tool were made in one piece with the cavity cut out of the solid metal it would be practically impossible to make the angle of the cavity sufficiently acute to answer the purpose, and on that account it is made in two parts, divided in a plane, $h$, parallel with the upper and under sides, the part $i$ being fitted in a cavity cut out of the other part. The two parts are held together by a metal strap, $j$, with a wedge, $k$, by means of which they can be taken apart for refacing when they are worn. As the angle of the cavity is at the junction of the two parts, by slightly curving the two faces the angle which is to form the angle of the tooth by swaging can be made very acute without difficulty.

The swage is to be set in the stock, so that when placed against any tooth of a saw, as seen in Fig. 4, with the face $d$ of the stock against one side of the saw-plate, the face $e$ of the stock will nearly touch the range of teeth. In that condition the head of the swage is struck with a hammer, which will have the effect to force the metal of the tooth into the acute angle of the swage to give it a form at and near the cutting-edge the reverse of the cavity into which it is thus forced, spreading the metal laterally and upsetting it in the bent part, and leaving the line of the cutting-edge at right angles with the plane of the saw-plate instead of being oblique therewith, as in the usual mode of setting saws.

The instrument thus formed I apply mainly to saw-teeth which have been bent laterally and each successive tooth alternately on opposite sides, which bending brings the line of the cutting-edge in an oblique position, so that by swaging the teeth so bent with this instrument the cutting-edge of the teeth is brought as it should be, at right angles to the plane of the saw-plate, and hence at right angles to the line of cut; but it can be beneficially employed to saw-teeth, however set, to bring the cutting-edge to the proper condition.

I do not wish to be understood as limiting my invention to the special mode of constructing the stock or of holding the two parts of the swage together or the entire swage in the stock, as other and equivalent modes may be substituted.

What I claim as my invention, and desire to secure by Letters Patent, is—

Forming the acute angle of the acting face of the swage to bring the cutting-edge of the saw-teeth to a sharp angle by making the said swage in two parts, substantially as specified.

PEARSON CROSBY.

Witnesses:
WM. H. BISHOP,
JOEL B. WILSON.